UNITED STATES PATENT OFFICE.

EDWARD R. HEWITT, OF NEW YORK, N. Y.

METHOD OF PRINTING PHOTOGRAPHS IN COLORS.

SPECIFICATION forming part of Letters Patent No. 549,790, dated November 12, 1895.

Application filed December 1, 1893. Serial No. 492,523. (Specimens.)

*To all whom it may concern:*

Be it known that I, EDWARD R. HEWITT, of New York city, in the county and State of New York, have invented a new and useful Improvement in Polychromatic Photography, of which the following is a full, clear, and exact description.

My invention relates to the method of producing photographic prints in which the sensitized film is rendered insoluble by light. In such processes a film containing a pigment has been used, and the exposure of the film to the light through a negative has rendered the film more or less insoluble in different places, so that the lighter parts could be dissolved away while the parts representing the shadows remain unaltered by the operation of dissolving out the parts affected by light.

My invention consists in superposing two or more layers of film-making material on a backing or foundation—such as paper, glass, celluloid, &c.—the several layers being of different colors, the compound film being made of sensitized material or of non-sensitive material capable of being subsequently sensitized.

In my improved process of polychromatic photography, as herein described, I employ sensitized gelatine as a medium; but I do not limit or confine myself to this material, as I may employ any of the known film-making materials which may be rendered insoluble by the action of light.

In carrying out my invention I take a backing formed of a sheet or a continuous strip of paper or other support and place upon it in any convenient way as many layers of gelatine as I wish to produce colors in the printed picture, each layer bearing its own color either in the form of a pigment intimately mixed with the gelatine in solution or in the form of a stain, and the colors are preferably arranged in the order in which they occur in the solar spectrum, the red or darker colors being nearest the backing and the violet or lighter colors the outermost in the series. All of the colors of the spectrum may be used, thus requiring a compound film formed of seven layers, or the three primary colors may be employed, or I may use any two colors which will give a good effect, such as flesh color for the lights in portraiture and a darker color for clothes, hair, &c.

The gelatine is rendered sensitive either in the manufacture of the film-coated paper or the paper may be prepard from non-sensitive gelatine, and it may be subsequently sensitized by dipping it in a solution of bichromate of potash or other like chromium compound according to the well-known method used in the ordinary carbon process. The paper thus prepared and sensitized is exposed under a photographic negative, which may be of the ordinary kind, or may be specially prepared to render certain colors in their relative intensities in black and white. It will easily be seen that I can arrange my colors to suit the special kind of negative or the special work in hand. The duration of the action of the light can be measured by any of the ordinary photometers in use. When the exposure is completed, the light passing through the clearer portion of the negative has acted down to the lower layers of the sensitized film, and nearly the whole thickness of the film has been rendered insoluble, while through the denser and darker portions of the negative the light has only acted upon the upper layers of the film making them insoluble. When this has taken place, I then prefer to wet the gelatine film for a minute or so with water and then press face downward upon another support which has been prepared with a sticky surface, such as coagulated albumen or gelatine or rosin solution. I then leave the surfaces in contact for a few minutes in the air and then immerse both supports together in warm water 30° to 50° centigrade or other solvent at a suitable temperature. After a while the original support can be removed and the soluble portions of the film washed away, leaving a colored picture on the second support, to which it has been affixed. When ready, the print is removed, washed in cold water, and bathed for a time in a solution of alum to harden the gelatine, and it is then washed and dried and is complete.

The ordinary process of double transferring, which consists in again removing the print to another support, may be used; but it is not always available as it reverses the order of the colors. The simple transfer method will give a print which is reversed from right to left from the original from which the photographic negative was taken. To correct this, the photographic negative may be reversed in printing with the film side outward.

In preparing my sensitive films I sometimes make them on a translucent support, such as a fabric, as linen or celluloid or a film of gelatine itself or any other light-transmitting surface. In this case the lighter colors are first placed nearer the support and the darker outward. When this method is employed, there must be no transference, and the picture can be developed directly after being exposed. The picture is developed, washed, and fixed as before. This method also gives a picture reversed from right to left from the original. This defect may be corrected as before by reversing the photographic negative.

It is obvious that in carrying out my invention I may make the different films of different thicknesses to accommodate the composite film to different uses.

In the manufacture of the paper I prefer to mix the pigment with the gelatine or other such substance and arrange the vessels containing the colored tissue compounds in suitable order and cause the tissue compounds to be applied in succession by allowing the paper to dip into the solution or by applying it with rollers or by some other suitable method. The successive layers may be dried between the operation of coating; but I prefer to only let the gelatine set to a stiff jelly and then apply the next layer and dry the whole when completed.

Having thus described my invention, I claim as new and desire to secure by Letters Patent—

The method of forming poly-chromatic photographic prints, which consists in applying to a suitable backing, a series of superposed films bearing different colors, corresponding approximately with the colors of the object photographed sensitizing the composite film formed of the films of different colors, rendering portions of the film insoluble by exposure to light through a negative, and finally developing the picture by washing with an appropriate solvent.

EDWARD R. HEWITT.

Witnesses:
 GEO. M. HOPKINS,
 EDGAR TATE.